United States Patent [19]
Lindemulder

[11] Patent Number: 5,926,540
[45] Date of Patent: Jul. 20, 1999

[54] RACK WITH CIRCUIT PACK CABLE ADAPTER AND METHOD OF OPERATION THEREOF

[75] Inventor: Charles R. Lindemulder, Denver, Colo.

[73] Assignee: Lucent Technologies Inc., Murray Hill, N.J.

[21] Appl. No.: 08/811,994

[22] Filed: Mar. 5, 1997

[51] Int. Cl.⁶ .................................................. H04M 3/00
[52] U.S. Cl. ..................................... 379/326; 174/DIG. 9
[58] Field of Search ..................................... 379/242, 325, 379/326, 327, 399, 426, 429, 438, 447, 454; 174/60, 69, DIG. 9; 361/825, 826, 827, 636; 191/12 R

[56] References Cited

U.S. PATENT DOCUMENTS

| | | | |
|---|---|---|---|
| 2,897,254 | 7/1959 | Dickinson | 174/69 X |
| 3,048,747 | 8/1962 | Errichiello | 174/DIG. 9 |
| 3,088,054 | 4/1963 | Meyer | 174/DIG. 9 X |
| 3,917,369 | 11/1975 | Sevec et al. | 174/DIG. 9 |
| 4,940,859 | 7/1990 | Peterson | 379/438 X |

*Primary Examiner*—Creighton Smith

[57] ABSTRACT

For use with a rack having a carrier backplane and capable of receiving modular circuit packs therein to be coupled to the carrier backplane, a circuit pack cable adapter that allows the modular circuit packs additionally to process signals originating from other than the carrier backplane, and a method of operation thereof. The circuit pack cable adapter includes: (1) a cable interface proximate a rear end of the circuit pack cable adapter and (2) an extension cable, coupled to the cable interface and couplable via the cable interface to a main cable passing through an aperture in the carrier backplane proximate the rear end, the extension cable deployable from a front end of the circuit pack cable adapter to at least one of the modular circuit packs to allow the modular circuit packs additionally to process signals originating from the main cable.

20 Claims, 3 Drawing Sheets

RACK WITH CIRCUIT PACK CABLE ADAPTER AND METHOD OF OPERATION THEREOF

TECHNICAL FIELD OF THE INVENTION

The present invention is directed, in general, to telecommunications switches and, more specifically, to a rack with a circuit pack cable adapter and a method of operating the adapter.

BACKGROUND OF THE INVENTION

Telephone switches, including private branch exchange ("PBX") switches, provide routing of data, voice and video signals to communicate information. Switching equipment links telephones, fax machines, computers, and other data systems together, so that people can exchange information no matter where they are located. Information can be sent in traditional ways with a person's voice speaking on the telephone, with facsimile transmission to send documents, or through data sent via computer systems, and use of satellites. The Internet's world wide web links global information and sites by travel through electronic switches and their software.

Conventional telecommunications switches are often housed in cabinets that have racks for mounting modular circuit packs therein. The modular circuit packs, or "cards," connect various processing and switching circuits to a backplane of the cabinet that allows data to be routed to individual cards, exchanged between the cards, and transmitted to communications devices, such as telephones, coupled to the switch. For example, all the extensions of a PBX are connected to line cards that slide into a PBX's rack-mounted cage. At the rear of the PBX cage, there are several connectors, each of which is coupled to the PBX's backplane. The backplane is typically running at a very high speed, since it carries many conversations, address information and considerable signaling. The capacity of the backplane determines the overall capacity of the switch.

Due to the proliferation of new media services that require broadband data transmission, such as real-time audio and video, conventional telecommunications switches must be adapted to support ever-increasing data rates. Thus, telecommunications switches must be designed to receive and transmit data via broadband transmission media, such as coaxial cable and fiber optics. Prior art methods of coupling modular circuit packs to broadband media have used "rack-and-panel" connectors for each slot in the rack. Using this method, the broadband input/output for a modular circuit pack is at the rear of the card, thus requiring that each circuit pack slot in a rack be equipped to accommodate such interconnections. Whereas it is unnecessary for each circuit pack in a typical configuration to require broadband interconnection, however, the prior art method adds unnecessary cost and complexity to the backplane. Furthermore, routing broadband media to many locations on a backplane makes it more difficult for a technician to service the interface between the rack and the cross connect field.

Accordingly, what is needed in the art is a circuit pack cable adapter that allows broadband interconnections to the front of modular circuit packs in a telecommunications rack. Furthermore, there is a need in the art for a method of coupling broadband media to modular circuit packs that does not require substantial modifications to standard backplane interconnections, and which provides for an easily serviceable interface between the rack and the cross connect field.

SUMMARY OF THE INVENTION

To address the above-discussed deficiencies of the prior art, the present invention provides for use with a rack having a carrier backplane and capable of receiving modular circuit packs therein to be coupled to the carrier backplane, a circuit pack cable adapter that allows the modular circuit packs additionally to process signals originating from other than the carrier backplane, and a method of operation thereof. The circuit pack cable adapter includes: (1) a cable interface proximate a rear end of the circuit pack cable adapter and (2) an extension cable, coupled to the cable interface and couplable via the cable interface to a main cable passing through an aperture in the carrier backplane proximate the rear end, the extension cable deployable from a front end of the circuit pack cable adapter to at least one of the modular circuit packs to allow the modular circuit packs additionally to process signals originating from the main cable. As used herein, "rear end" generally refers to an end of the circuit pack cable adapter that is proximate the backplane of a carrier into which the adapter is inserted, and "front end" generally refers to an end of the circuit pack cable adapter that is proximate the front, or face, of a carrier into which the adapter is inserted. Additionally, "cable" is used herein to refer to all types of physical data transmission media including, without limitation, fiber optics, coaxial and twisted-pair.

The present invention provides an advantageous way of allowing a rack that was originally designed only to process electrical signals to accommodate the processing of signals originating from other than the carrier backplane without substantially modifying the rack. The present invention introduces a structure that brings the signals originating from other than the carrier backplane to the front of the rack, allowing the interconnection of a modular circuit pack to the signals originating from other than the carrier backplane to be made on the front of the modular circuit pack without compromising the connections to the carrier backplane.

In one embodiment of the present invention, the main cable, which passes through an aperture in the carrier backplane proximate the rear end of the circuit pack cable adapter, is an optical fiber. In a related embodiment, a transmit main cable and a receive main cable, which may also be optical fibers, pass through the aperture in the carrier backplane proximate the rear end of the circuit pack cable adapter and are coupled to a cable interface proximate a rear end of the circuit pack cable adapter. Those skilled in the art are familiar with dual-fiber backbones. The present invention can, but is not required to, operate with multiple optical fibers.

In one embodiment of the present invention, the circuit pack cable adapter further includes a cable spool that stores at least a portion of the extension cable. In a related embodiment, to accommodate the variable distance between the location of the circuit pack cable adapter and modular circuit packs within the rack, the extension cable has a length that is sufficient to couple to any modular circuit pack within the rack, an excess portion of the extension cable being stored on the cable spool as required.

In one embodiment of the present invention, the extension cable couples selected ones of the modular circuit packs to a main cable passing through an aperture in the carrier backplane proximate the rear end of the circuit pack cable adapter. In an embodiment to be illustrated and described, the main cable is an optical fiber carrying optical signals that are routed by the extension cable to optical-capable modular circuit packs mounted in the rack.

In one embodiment of the present invention, the circuit pack cable adapter includes a planar card that supports the cable interface and the extension cable. In a related embodiment, the circuit pack cable adapter further includes a faceplate proximate the front end thereof, the faceplate having a cable guide that receives the extension cable therethrough.

In one embodiment of the present invention, the circuit pack cable adapter is nonremovably fixed within the rack. Alternatively, the circuit pack cable adapter may be fitted with guides that allow it to be readily inserted and removed from the rack in a manner similar to that of other modular circuit packs that may be received into the rack.

In one embodiment of the present invention, a telecommunications switch, of which the rack forms a part, is a PBX. Those skilled in the art are familiar with the structure and operation of a PBX. The present invention is advantageously cooperable with a PBX rack to allow modular circuit packs mounted therein to process signals originating from other than the carrier backplane without significant modifications to the mechanical structure of the rack. Of course, the present invention may be employed with other rack-mountable systems, telecommunications-related or otherwise.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
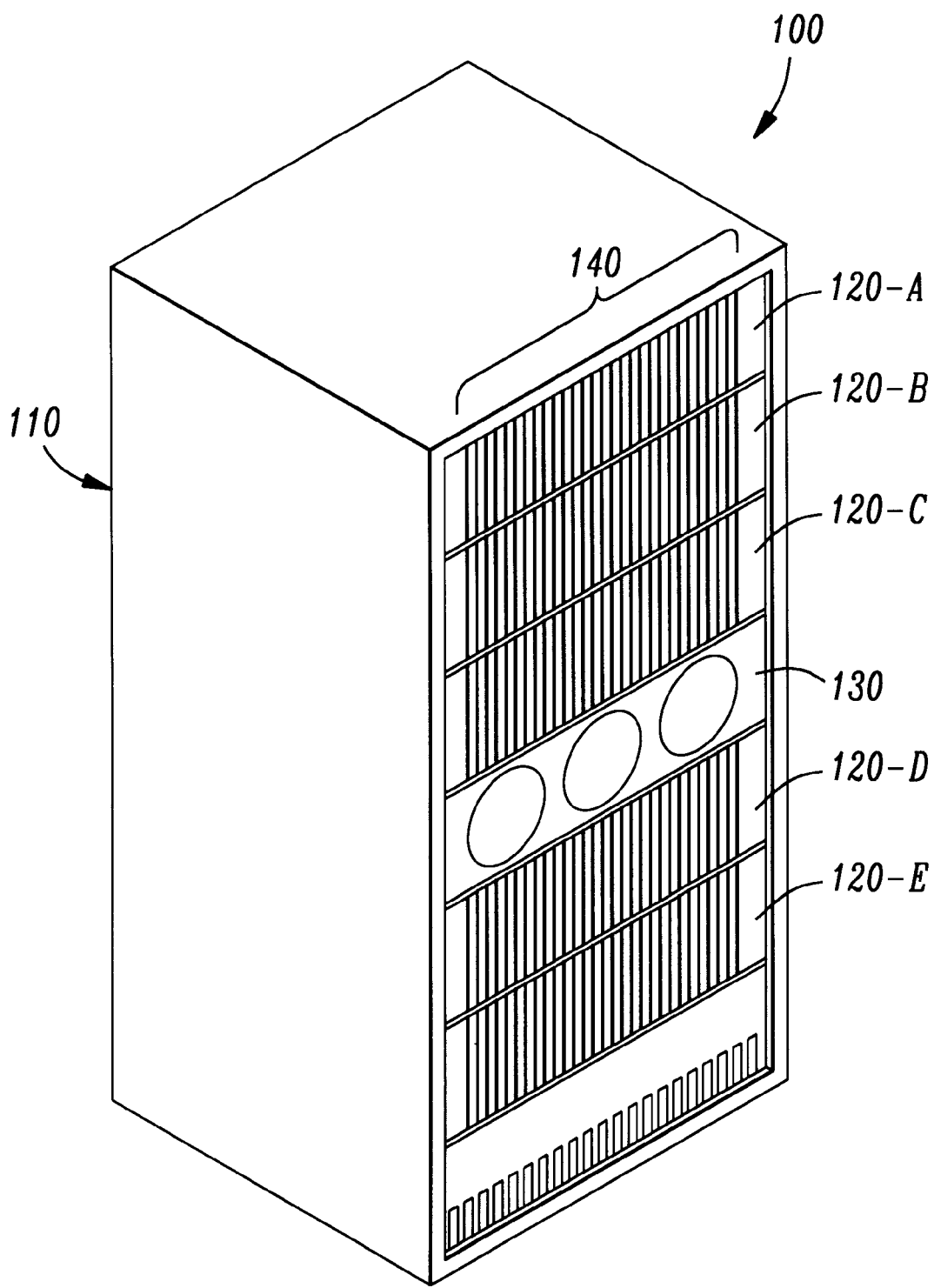
FIG. 1 illustrates an exemplary telecommunications switch rack.

Referring initially to FIG. 1, illustrated is an exemplary telecommunications switch rack 100. The exemplary switch rack 100 includes a cabinet 110 that houses carriers 120-A, 120-B, 120-C, 120-D, 120-E (generally designated hereinafter as carrier 120), and a fan assembly 130. Each carrier 120 includes a plurality of slots for receiving modular circuit packs, generally designated as 140, that provide processing and switching functions for data transmitted via a telecommunications medium (not shown) coupled thereto. A backplane (not shown) is mounted to the rear of each carrier 120, and provides electrical interconnections for each modular circuit pack 140. In one embodiment, switch rack 100 is a PBX; the principles of the present invention are not, however, limited to a specific type or brand of switch. The present invention discloses a novel circuit pack cable adapter, for use with switch rack 100, for adding broadband capability to conventional modular circuit packs, without substantially modifying the design of the backplane of switch rack 100.

Figure 2:
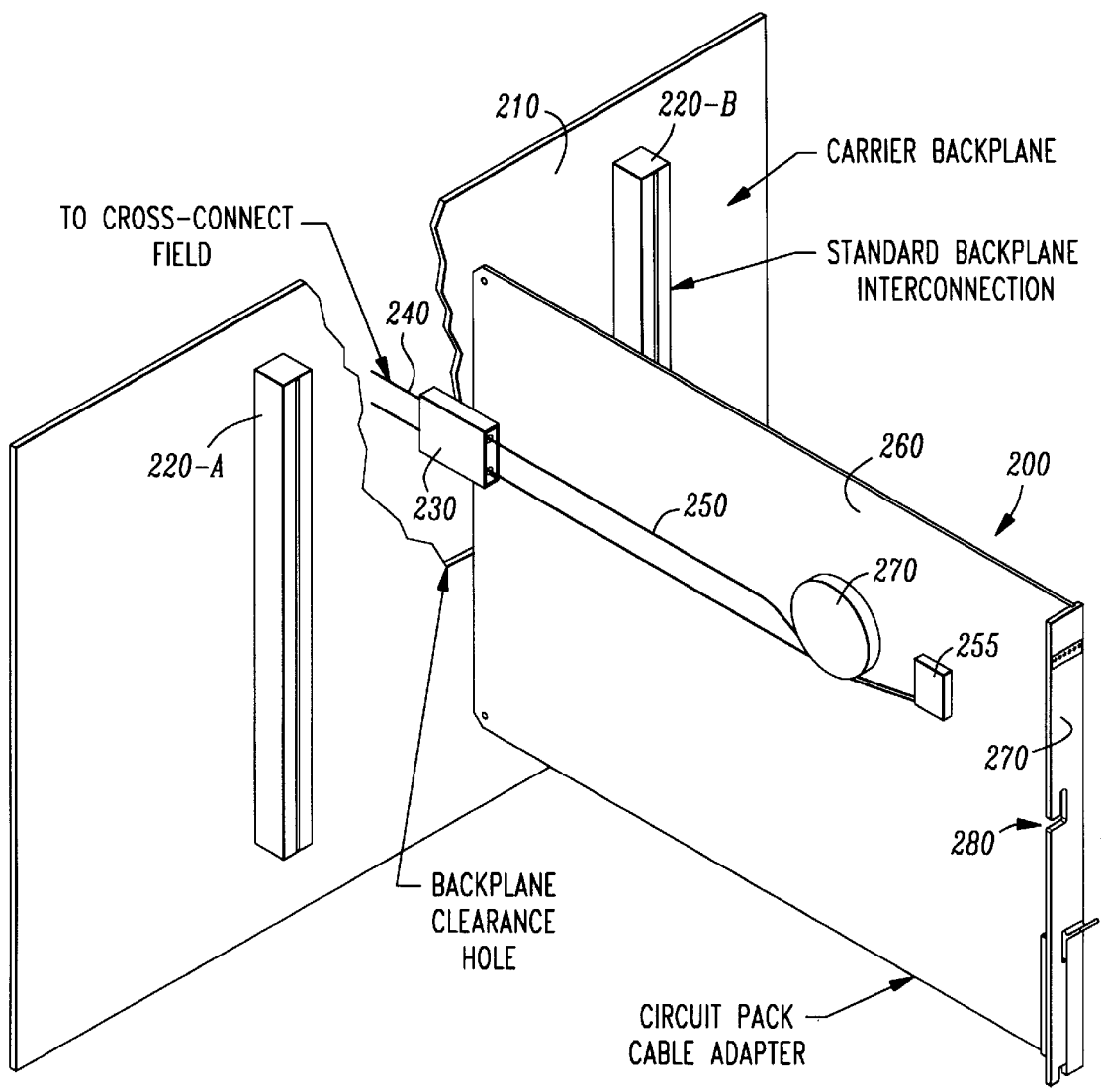
FIG. 2 illustrates an exemplary embodiment of a circuit pack cable adapter according to the principles of the present invention.

Turning now to FIG. 2, illustrated is an exemplary embodiment of a circuit pack cable adapter 200, according to the principles of the present invention, for use with an exemplary conventional carrier backplane 210 having standard backplane interconnections 220-A, 220-B. The circuit pack cable adapter 200 includes a cable interface 230 proximate a rear end thereof, and is preferably positioned in a carrier 120 (reference FIG. 1) such that a main cable 240 can be directed through an aperture in carrier backplane 210 and coupled to the cable interface 230.

In one embodiment, the main cable 240 is an optical fiber; those skilled in the art will recognize, however, that the principles of the present invention are not limited to a particular transmission medium. Furthermore, in one embodiment, cable interface 230 includes both a transmit connector and a receive connector for coupling to a transmit main cable and a receive main cable, respectively. Those skilled in the art are familiar with various bi-directional and uni-directional transmission media, and will recognize the adaptability of the present invention to accommodate such various transmission media.

Circuit pack cable adapter 200 further includes an extension cable 250 that is couplable to the main cable 240 via the cable interface 230. In one embodiment, the extension cable 240 includes a cable terminator 255 that has a structure suitably operative to couple extension cable 250 to a modular circuit pack 140 (reference FIG. 1). The extension cable 250 is deployable from a front end of the circuit pack cable adapter 200, whereby it can be coupled to a modular circuit pack 140 mounted in a carrier 120, thereby allowing a modular circuit pack 140 to process signals originating from a main cable 240 in addition to signals originating or transmitted through backplane 210.

In one embodiment, the circuit pack cable adapter 200 includes a generally planar card 260 that provides support for cable interface 230 and extension cable 250; those skilled in the art will conceive of other structures suitably operative to provide such support. In a related embodiment, circuit pack cable adapter further includes a cable spool 270 that can be used to store at least a portion of the extension cable 250. Because modular circuit packs 140 can be mounted in carrier 120 at various distances from a location of circuit pack cable adapter 200, a cable spool advantageously provides a means of storing an excess length of an extension cable 250 having a predetermined length.

In one embodiment, the circuit pack cable adapter 200 is nonremovably fixed within the carrier 120, or switch rack 100, proximate an aperture in backplane 210. Those skilled in the art will recognize, however, that a backplane may include multiple apertures, and an adapter 200 may be removably inserted at positions proximate each aperture. In a related embodiment, circuit pack cable adapter 200 also includes a faceplate 270 proximate to a front end thereof having a cable guide 280 through which extension cable 250 can be deployed. The faceplate 270 preferably has dimensions substantially similar to the dimensions of the faceplates for modular circuit packs 140 conventionally used with exemplary carrier 120.

Figure 3:
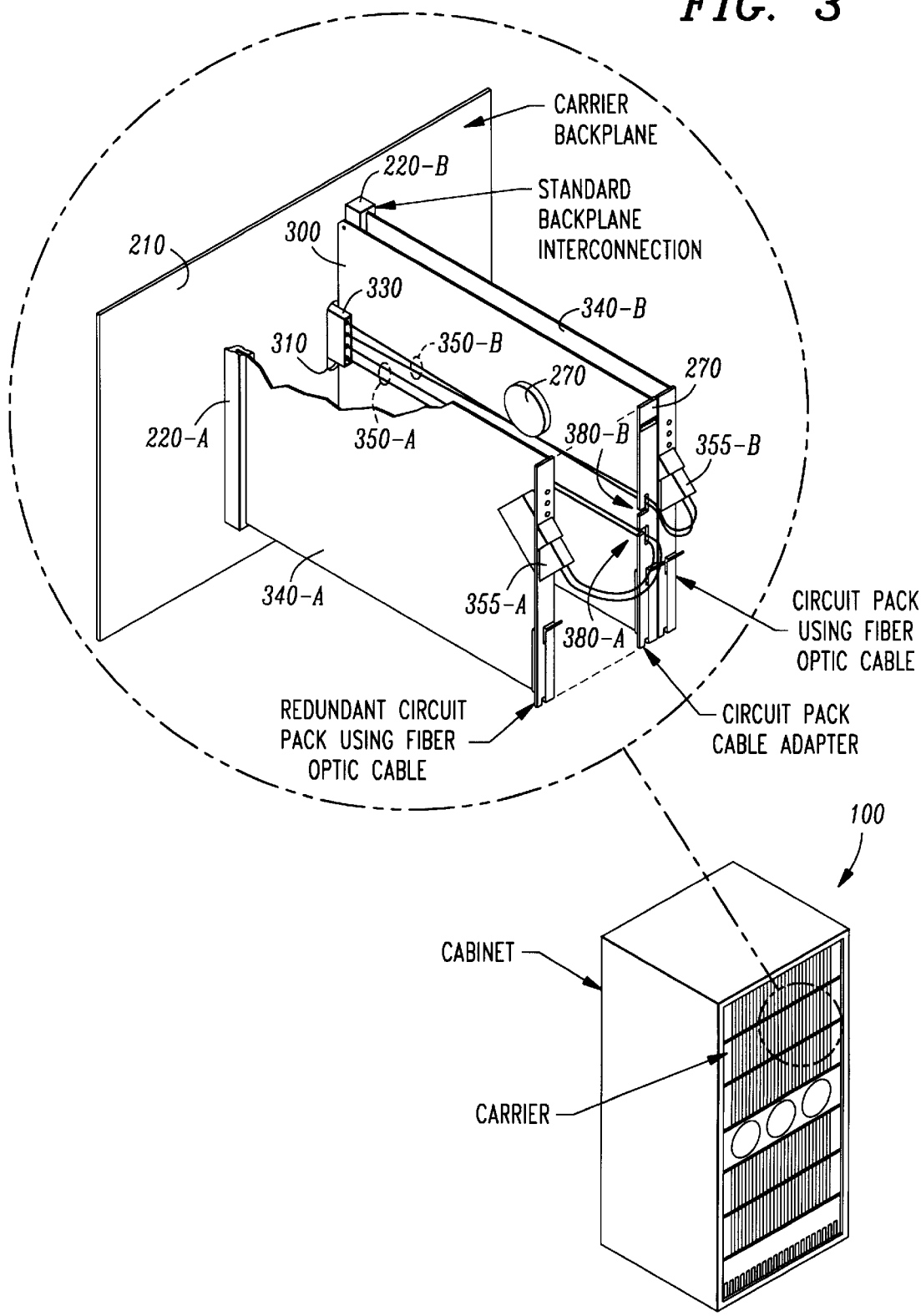
FIG. 3 illustrates an exemplary application of a circuit pack cable adapter.

Turning now to FIG. 3, illustrated is an exemplary application of an exemplary circuit pack cable adapter 300. In some applications, multiple modular circuit packs having broadband communications capabilities may be required for purposes of redundancy. Those skilled in the art are familiar with the use of redundant hardware to avoid the risks associated with single-point failures. Accordingly, FIG. 3 illustrates an application of a circuit pack cable adapter 300 for providing broadband capability to redundant modular circuit packs 340-A and 340-B, which are coupled to backplane 210 by standard backplane interconnections 220-A, 220-B. Modular circuit packs 340-A, 340-B may provide, for example, redundant asynchronous transfer mode ("ATM") processing of broadband data.

To facilitate the use of exemplary circuit pack cable adapter 300 with a conventional backplane 210, backplane 210 is modified to include an aperture 310 therein. The exemplary circuit pack cable adapter 300 includes a cable interface 330 proximate a rear end thereof. The cable interface 330 is positioned proximate to the aperture 310 such that a main cable (not shown) can be coupled thereto. In the embodiment illustrated, circuit pack cable adapter 300 includes first and second extension cables 350-A and 350-B, which are deployed through first and second cable guides 380-A and 380-B, respectively. The first and second extension cables 350-A, 350-B include first and second cable terminators 355-A and 355-B that couple extension cables 350-A and 350-B to redundant modular circuit packs 340-A and 340-B, respectively. By coupling a main cable carrying broadband data to the front of modular circuit packs 340-A, 340-B, no modification of the standard backplane interconnections 220-A, 220-B is required, thereby allowing for the design and use of new, more advanced modular circuit packs 340-A, 340-B with existing switch rack designs.

Although the present invention has been described in detail, those skilled in the art should understand that they can make various changes, substitutions and alterations herein without departing from the spirit and scope of the invention in its broadest form.

What is claimed is:

1. For use with a rack having a carrier backplane and capable of receiving modular circuit packs therein to be coupled to said carrier backplane, a circuit pack cable adapter that allows said modular circuit packs additionally to process signals originating from other than said carrier backplane, comprising:
    a cable interface proximate a rear end of said circuit pack cable adapter; and
    an extension cable, coupled to said cable interface and couplable via said cable interface to a main cable passing through an aperture in said carrier backplane proximate said rear end, said extension cable deployable from a front end of said circuit pack cable adapter to at least one of said modular circuit packs to allow said modular circuit packs additionally to process signals originating from said main cable.

2. The adapter as recited in claim 1 further comprising a cable spool that stores at least a portion of said extension cable.

3. The adapter as recited in claim 1 further comprising a generally planar card that supports said cable interface and said extension cable.

4. The adapter as recited in claim 1 wherein said aperture accepts a transmit main cable and a receive main cable therethrough and said cable interface comprises a transmit connector and a receive connector.

5. The adapter as recited in claim 1 wherein said main cable comprises an optical fiber.

6. The adapter as recited in claim 1 further comprising a faceplate proximate said front end and having a cable guide that receives said extension cable therethrough.

7. The adapter as recited in claim 1 wherein said adapter is nonremovably fixed within said rack.

8. For use with a rack having a carrier backplane and capable of receiving modular circuit packs therein to be coupled to said carrier backplane, a method of additionally processing signals originating from other than said carrier backplane in said modular circuit packs, comprising the steps of:
    inserting a circuit pack cable adapter into said rack, said adapter including:
        a cable interface proximate a rear end of said circuit pack cable adapter; and
        an extension cable, coupled to said cable interface, said extension cable deployable from a front end of said circuit pack cable adapter;
    coupling said cable interface to a main cable passing through an aperture in said carrier backplane proximate said rear end of said circuit pack cable adapter; and
    coupling said extension cable to at least one of said modular circuit packs to allow said modular circuit packs additionally to process signals originating from said main cable.

9. The method as recited in claim 8 wherein said circuit pack cable adapter further comprises a cable spool that stores at least a portion of said extension cable.

10. The method as recited in claim 8 wherein said circuit pack cable adapter further comprises a generally planar card that supports said cable interface and said extension cable.

11. The method as recited in claim 8 wherein said aperture accepts a transmit main cable and a receive main cable therethrough and said cable interface comprises a transmit connector and a receive connector.

12. The method as recited in claim 8 wherein said main cable comprises an optical fiber.

13. The method as recited in claim 8 wherein said circuit pack cable adapter further comprises a faceplate proximate said front end and having a cable guide that receives said extension cable therethrough.

14. The method as recited in claim 8 wherein said step of inserting comprises the step of nonremovably fixing said circuit pack cable adapter within said rack.

15. A telecommunications switch, comprising:
    a rack having a carrier backplane;
    a plurality of modular circuit packs received into said rack and coupled to said carrier backplane, at least one of said plurality of modular circuit packs being capable of processing signals originating from other than said carrier backplane;
    a circuit pack cable adapter, including:
        a cable interface proximate a rear end of said circuit pack cable adapter; and
        an extension cable, coupled to said cable interface and couplable via said cable interface to a main cable passing through an aperture in said carrier backplane proximate said rear end, said extension cable deployable from a front end of said circuit pack cable adapter to at least one of said modular circuit packs to allow said modular circuit packs additionally to process signals originating from said main cable.

16. The telecommunications switch as recited in claim 15 wherein said circuit pack cable adapter further comprises a cable spool that stores at least a portion of said extension cable.

17. The telecommunications switch as recited in claim 15 wherein said circuit pack cable adapter further comprises a faceplate proximate said front end and having a cable guide that receives said extension cable therethrough.

18. The telecommunications switch as recited in claim 15 wherein said main cable comprises an optical fiber.

19. The telecommunications switch as recited in claim 15 wherein said circuit pack cable adapter is nonremovably fixed within said rack.

20. The telecommunications switch as recited in claim 15 wherein said telecommunications switch is a PBX.

* * * * *